W. B. THOMPSON.
SPRING RETAINER.
APPLICATION FILED SEPT. 4, 1919.
1,333,353.
Patented Mar. 9, 1920.
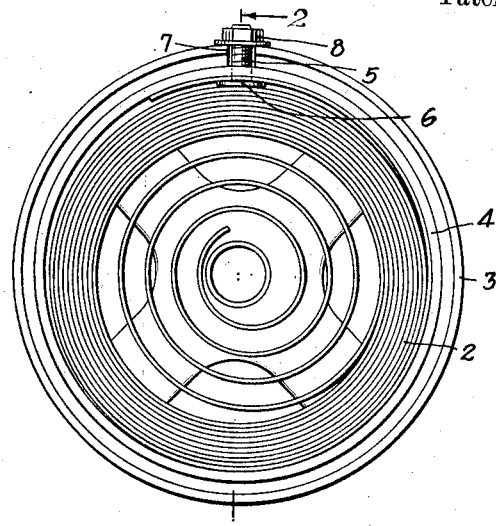
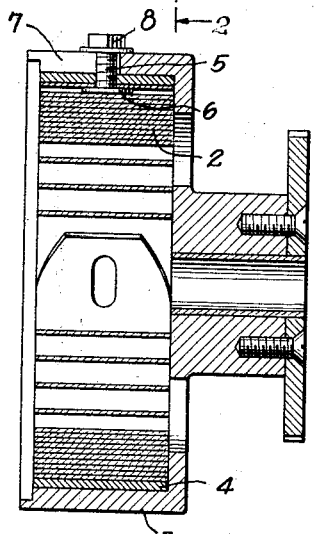
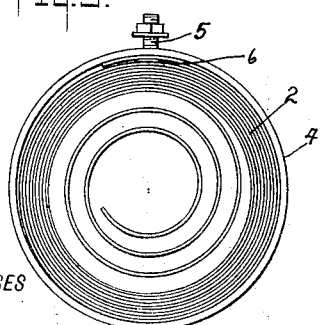
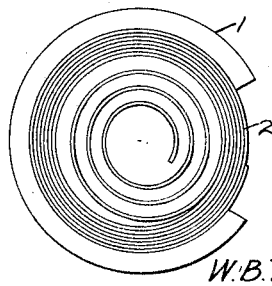
WITNESSES
Frederick Diehl.
A. L. Kitchin.
INVENTOR
W. B. THOMPSON
BY Munn & Co.
ATTORNEYS

UNITED STATES PATENT OFFICE.

WILLIAM B. THOMPSON, OF NEW YORK, N. Y.

SPRING-RETAINER.

1,333,353. Specification of Letters Patent. Patented Mar. 9, 1920.

Application filed September 4, 1919. Serial No. 321,579.

*To all whom it may concern:*

Be it known that I, WILLIAM B. THOMPSON, a subject of the King of Great Britain, having taken out first United States citizenship papers, and a resident of the city of New York, Port Richmond, borough of Richmond, in the county of Richmond and State of New York, have invented a new and useful Spring-Retainer, of which the following is a full, clear, and exact description.

This invention relates to retaining devices, and has for an object to provide an improved construction wherein the spring remains in an inclosing member while in use.

Another object is to provide an inclosing retainer to which the spring is secured and which is formed to fit into the spring barrel.

A further object is to provide a spring retainer for the springs of talking machines and the like, formed to slidingly fit into the barrel of the talking machine and connect one end of the spring rigidly to the socket.

In the accompanying drawing:

Figure 1 is a plan view of a retainer embodying the invention, the same being shown in position in a talking machine socket or spring casing.

Fig. 2 is a section through Fig. 1 on line 2—2.

Fig 3 is a plan view of a spring and a retainer embodying the invention.

Fig. 4 is a plan view of a spring and an old well known retainer.

Referring to the accompanying drawing by numerals, 1 indicates a retainer which is old and well known. This retainer is merely a rod bent so as to extend partly around the spring 2 so as to prevent the spring from unwinding. Heretofore it was necessary to force the spring 2 from the retainer 1, which will cause it to expand and then carefully wind it again in the casing 3 after having secured one end to the casing. This is a very difficult job and if the spring slips it is liable to cut the workman. To obviate or rather dispense with this way of applying the spring 2, a special retaining ring 4 is provided of a size to freely slide into the casing 3. This ring is provided with an aperture through which the bolt 5 passes, said bolt being formed with a rather large flat head 6 which bears against one end of the spring. Bolt 5 extends through a suitable aperture in the spring and a slot 7 in the casing 3 which has been especially provided therefor. A suitable washer and nut are carried by the outer end of the bolt so that the bolt may be tightened and the end of the spring and also the ring 4 may be clamped rigidly together and to the casing 3. It will be understood that the ring 4 must be made to fit the spring barrel or casing 3 and is, of course, varied to fit the different makes of talking machines and other machines using spring motors. Whenever the spring 2 breaks the nut 8 is loosened and the nut 8, bolt 5, ring 4, and spring 2 are taken out and thrown away and a new spring and a new retainer substituted.

What I claim is:

1. In a spring retainer, the combination with a spring receiving barrel formed with a slot, of a spring carrying ring capable of fitting in said barrel, a bolt extending through one end of said spring, said ring and through said slot, and means engaging the outer part of the bolt for clamping the end of the spring and the ring against the wall of said barrel.

2. In a spring retainer the combination with a spring receiving casing having an opening, of a spring receiving ring capable of fitting in said casing and limiting the unwinding of the spring, a bolt extending through said ring, part of said spring and the opening in said casing, and a nut engaging said bolt for clamping the ring against the casing.

WILLIAM B. THOMPSON.